US009230325B2

United States Patent
Hu et al.

(10) Patent No.: US 9,230,325 B2
(45) Date of Patent: Jan. 5, 2016

(54) THREE-DIMENSIONAL MODEL ACQUISITION USING PLANAR MIRRORS

(75) Inventors: Bo Hu, Rochester, NY (US); Jacek Antoni Wojtczak, Rochester, NY (US); Christopher Brown, Rochester, NY (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 557 days.

(21) Appl. No.: 13/589,023

(22) Filed: Aug. 17, 2012

(65) Prior Publication Data
US 2013/0044190 A1 Feb. 21, 2013

Related U.S. Application Data

(60) Provisional application No. 61/525,688, filed on Aug. 19, 2011.

(51) Int. Cl.
*H04N 13/02* (2006.01)
*G06T 7/00* (2006.01)
*G06K 9/00* (2006.01)

(52) U.S. Cl.
CPC ............ *G06T 7/0018* (2013.01); *G06T 7/0065* (2013.01); *G06T 2207/30196* (2013.01); *G06T 2207/30204* (2013.01)

(58) Field of Classification Search
CPC ..... H04N 13/02; H04N 13/0497; H04N 9/00; G06T 17/00; G06T 7/20; G06K 9/34; G06K 9/00; G06K 9/00771; G06K 9/209; G01B 11/24; H01L 27/00
USPC .................... 348/50, E13.074; 345/419, 630; 382/154, 103
See application file for complete search history.

(56) References Cited

U.S. PATENT DOCUMENTS

| 5,048,904 A * | 9/1991 | Montagu .................. 359/202.1 |
| 6,751,344 B1 * | 6/2004 | Grumbine .................... 382/154 |

(Continued)

FOREIGN PATENT DOCUMENTS

WO WO0146742 A2 * 6/2001 ............. G01N 21/00

OTHER PUBLICATIONS

"Camera calibration using reflections in planar mirrors and object reconstruction using volume carving method" by Martins et.al., DOI: 10.1179/136821904225011609, The Imaging Science Journal vol. 52, © RPS 2004.*

(Continued)

*Primary Examiner* — Dave Czekaj
*Assistant Examiner* — Dramos I Kalapodas
(74) *Attorney, Agent, or Firm* — McDermott Will & Emery LLP

(57) ABSTRACT

3-D model acquisition of an object is performed using two planar mirrors and a camera. According to some embodiments, 3-D reconstruction is achieved by recovering the scene geometry, including the equations of the mirrors, the camera parameters and the position of the markers, which give the location and orientation of the subjects. After establishing the geometry, a volume intersection algorithm is applied to build a 3-D model of the subject. Camera parameters and spatial constraints of the mirrors may be initially unknown. Camera parameters may be solved with reference to the object and references in the object. Further, distance from the camera to at least one point on the object may be determined once camera parameters are solved. Markers having fixed relative positions may be provided on the object for reference.

18 Claims, 10 Drawing Sheets

(56) References Cited

U.S. PATENT DOCUMENTS

| | | | |
|---|---|---|---|
| 7,830,528 B2* | 11/2010 | Koh et al. | 356/601 |
| 8,629,388 B2* | 1/2014 | Yu et al. | 250/208.1 |
| 2002/0050988 A1* | 5/2002 | Petrov et al. | 345/418 |
| 2003/0095186 A1* | 5/2003 | Aman et al. | 348/162 |
| 2004/0085549 A1* | 5/2004 | Smets et al. | 356/614 |
| 2008/0074648 A1* | 3/2008 | Lampalzer | 356/73 |
| 2008/0100622 A1* | 5/2008 | Gordon | 345/427 |
| 2008/0152192 A1* | 6/2008 | Zhu et al. | 382/103 |
| 2010/0053639 A1* | 3/2010 | Maier | 356/620 |
| 2011/0122233 A1* | 5/2011 | Kasai et al. | 348/49 |
| 2012/0038549 A1* | 2/2012 | Mandella et al. | 345/156 |
| 2013/0038696 A1* | 2/2013 | Ding et al. | 348/47 |

OTHER PUBLICATIONS

"3-D Reconstruction Using Mirror Images Based on a Plane Symetry Recovery Method" by Hiroshi Mitsumoto et al., 0162-8828/92 © 1992 IEEE.*

"Three-Dimensional Reconstruction Using the Perpendicularity Constraint" by B. Boufama et al., 0-7695-2939-4/07 © 2007 IEEE.*

"A Real-Time Catadioptric Stereo System Using Planar Mirrors" by J. Gluckman and Shree K. Nayar, Dept. of Computer Science, Columbia University, New York; N00014-97-1-0553, 1998.*

"Structure and Motion From Silhouettes", by Kwan-Yee K. Wong et al., University of Cambridge, Dec. 2009.*

"Data-Driven Feature-Based 3D Face Synthesis" Yu Zhang and Shuhong Xu, Institute of High Performance Computing, Sixth International Conference on 3-D Digital Imaging and Modeling (3DIM 2007) 0-7695-2939-4/07 © 2007 IEEE.*

K. Forbes, et al., "Shape-from-Silhouette with Two Mirrors and an Uncalibrated Camera," ECCV 2006, Part II, LNCS 3952, pp. 165-178; Springer-Verlag Berlin Heidelberg (2006).

B. Hu, "It's All Done with Mirrors: Calibration-and-Correspondence-Free 3D Reconstruction," 2009 IEEE Canadian Conference on Computers and Robot Vision, pp. 148-154.

B. Hu, et al., "The geometry of point light source from shadows," The University of Rochester Computer Science Department, Technical Report 810, Jun. 2004.

* cited by examiner

THREE-DIMENSIONAL MODEL ACQUISITION USING PLANAR MIRRORS

RELATED APPLICATIONS

This application claims priority, pursuant to 35 U.S.C. §119, to U.S. Provisional Patent Application No. 61/525,688, filed Aug. 19, 2011, titled Three-dimensional Model Acquisition Using Planar Mirrors.

FIELD

The present disclosure relates to visualization of three-dimensional objects.

BACKGROUND

Three-dimensional reconstruction or rendering of objects may be performed based on captured images of the objects. Multiple views of an object may be provided by one or more mirrors providing reflections of the object. An image captured may be analyzed and three-dimensional renderings produced based on information gathered from the image, such as distance from a camera to a point or region and silhouette data.

SUMMARY

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clause _____. The other clauses can be presented in a similar manner.

1. A method, comprising:
   with a camera, capturing a first image while a marker set, comprising a plurality of markers, and an object are in a first orientation relative to the camera;
   with the camera, capturing a second image while the marker set and the object are in a second orientation, different than the first orientation, relative to the camera;
   wherein each of the first image and the second image comprises:
      a direct view of (i) the marker set, each of the markers having a fixed position relative to every other of the markers and (ii) the object; and
      a first reflection view of a first reflection of the markers and the object in a first mirror;
   based on (i) the direct view of the marker set in the first image, (ii) the first reflection view of the marker set in the first image, (iii) a known distance between two of the markers, and (iv) a focal length of the camera, determining a first indicator, of the first orientation.
   based on (i) the direct view of the marker set in the second image, (ii) the first reflection view of the marker set in the second image, (iii) the known distance between two of the markers, and (iv) the focal length of the camera, determining a second indicator, of the second orientation;
   based on (i) the direct view of the object in the first image, (ii) the first reflection view of the object in the first image, (iii) the first indicator, (iv) the direct view of the object in the second image, (v) the first reflection view of the object in the second image, and (vi) the second indicator, rendering a three-dimensional model of the object.

2. The method of clause 1, wherein determining the first indicator comprises determining distances from the camera to each of the markers.

3. The method of clause 2, wherein determining distances from the camera to each of the markers comprises:
   determining each of the distances as a scale factor;
   converting the scale factor to an absolute distance based on the known distance between at least two of the markers.

4. The method of clause 1, further comprising: outputting the model to a display.

5. The method of clause 1, further comprising:
   capturing a plurality of additional images as the object is rotated relative to the camera; and
   for each of the plurality of additional images, determining an orientation of the object relative to the camera.

6. The method of clause 1, wherein the first mirror and the second mirror are planar mirrors oriented relative to each other with an initially unknown angle.

7. The method of clause 1, wherein the first mirror and the second mirror are stationary.

8. The method of clause 1, wherein each of the first image and the second image further comprises:
   a second reflection view of a second reflection of the marker set and the object in a second mirror; and
   a third reflection view of a third reflection, of the first reflection in the second mirror.

9. The method of clause 8, further comprising determining an indicator of the focal length of the camera by the equation:

$$\begin{pmatrix} u_{m_2} - u_o \\ v_{m_2} - v_o \\ f \end{pmatrix} \cdot \begin{pmatrix} u_{e_2} - u_o \\ v_{e_2} - v_o \\ f \end{pmatrix} = 0,$$

where
   $u_o$ and $v_o$ are coordinates, on the first image and the second image, of a principal point;
   $u_{m2}$ and $v_{m2}$ are coordinates, on the first image and the second image, of a vanishing point of lines $i_{a12}$ $i_{a2}$ and $i_{b12}$ $i_{b2}$;
   $u_{e2}$ and $v_{e2}$ are coordinates, on the first image and the second image, of a vanishing point of (i) a line between one of the markers and a second reflection of the one of the markers and (ii) a line between a first reflection of the one of the markers and a third reflection of the one of the markers; and
   f is the focal length.

10. The method of clause 9, wherein the principal point is the center of the image.

11. A method, comprising:
    with a camera, capturing a first image while a marker set, comprising a plurality of markers each having a fixed position relative to every other of the markers, and an object are in a first orientation relative to the camera;
    with the camera, capturing a second image while the marker set and the object are in a second orientation, different than the first orientation, relative to the camera;

wherein each of the first image and the second image comprises:
  a direct view of (i) the marker set and (ii) the object;
  a first reflection view of a first reflection of the marker set and the object in a first mirror;
  a second reflection view of a second reflection of the marker set and the object in a second mirror; and
  a third reflection view of a third reflection, of the first reflection in the second mirror;
based on (i) the direct view of the marker set in the first image, (ii) the first reflection view of the marker set in the first image, (iii) the second reflection view of the marker set in the first image, (iv) the third reflection view of the marker set in the first image, and (v) a known distance between two of the markers, determining a first indicator, of the first orientation.
based on (i) the direct view of the marker set in the second image, (ii) the first reflection view of the marker set in the second image, (iii) the second reflection view of the marker set in the second image, (iv) the third reflection view of the marker set in the second image, and (v) the known distance between two of the markers, determining a second indicator, of the second orientation;
based on (i) the direct view of the object in the first image, (ii) the first reflection view of the object in the first image, (iii) the first indicator, (iv) the direct view of the object in the second image, (v) the first reflection view of the object in the second image, and (vi) the second indicator, rendering a three-dimensional model of the object.

12. The method of clause 11, wherein determining the first indicator comprises determining distances from the camera to each of the markers.

13. The method of clause 12, wherein determining distances from the camera to each of the markers comprises:
  determining each of the distances as a scale factor;
  converting the scale factor to an absolute distance based on the known distance between at least two of the markers.

14. The method of clause 11, further comprising: outputting the model to a display.

15. The method of clause 11, further comprising:
  capturing a plurality of additional images as the object is rotated relative to the camera; and
  for each of the plurality of additional images, determining an orientation of the object relative to the camera.

16. A computer implementation system, comprising:
  a capturing module configured to capture, from a camera and by a processor, a first image while a marker set, comprising a plurality of markers, and an object are in a first orientation relative to the camera;
  wherein the capturing module is further configured to capture a second image while the marker set and the object are in a second orientation, different than the first orientation, relative to the camera;
  wherein each of the first image and the second image comprises:
    a direct view of (i) the marker set, each of the markers having a fixed position relative to every other of the markers and (ii) the object; and
    a first reflection view of a first reflection of the markers and the object in a first mirror;
  a determining module configured to determine, by a processor, a second indicator, of the second orientation, based on (i) the direct view of the marker set in the first image, (ii) the first reflection view of the marker set in the first image, (iii) a known distance between two of the markers, and (iv) a focal length of the camera;
  wherein the determining module is further configured to determine, by a processor, a second indicator, of the second orientation, based on (i) the direct view of the marker set in the second image, (ii) the first reflection view of the marker set in the second image, (iii) the known distance between two of the markers, and (iv) the focal length of the camera;
  a rendering module configured to render a three-dimensional model of the object, based on (i) the direct view of the object in the first image, (ii) the first reflection view of the object in the first image, (iii) the first indicator, (iv) the direct view of the object in the second image, (v) the first reflection view of the object in the second image, and (vi) the second indicator.

17. The method of clause 16, further comprising an outputting module configured to output the model to a display.

18. The computer implementation system of clause 16, wherein each of the first image and the second image further comprises:
  a second reflection view of a second reflection of the marker set and the object in a second mirror; and
  a third reflection view of a third reflection, of the first reflection in the second mirror.

19. The computer implementation system of clause 17, wherein the determining module is further configured to determine an indicator of the focal length of the camera by the equation:

$$\begin{pmatrix} u_{m_2} - u_o \\ v_{m_2} - v_o \\ f \end{pmatrix} \cdot \begin{pmatrix} u_{e_2} - u_o \\ v_{e_2} - v_o \\ f \end{pmatrix} = 0,$$

where
  $u_o$ and $v_o$ are coordinates, on the first image and the second image, of a principal point;
  $u_{m_2}$ and $v_{m_2}$ are coordinates, on the first image and the second image, of a vanishing point of lines $i_{a12}$ $i_{a2}$ and $i_{b12}$ $i_{b2}$;
  $u_{e_2}$ and $v_{e_2}$ are coordinates, on the first image and the second image, of a vanishing point of (i) a line between one of the markers and a second reflection of the one of the markers and (ii) a line between a first reflection of the one of the markers and a third reflection of the one of the markers; and
  f is the focal length.

20. The computer implementation system of clause 16, wherein the principal point is the center of the image.

21. A method, comprising:
  simultaneously activating each of a plurality of markers comprising a first marker, a second marker, and a third marker;
  capturing a calibration image containing a view of the plurality of markers, a first reflection of the plurality of markers in a first mirror, a second reflection of the plurality of markers in a second mirror, and a third reflection of the first reflection in the second mirror;
  activating each of the plurality of markers separately;
  as each of the plurality of markers is activated, capturing a reference image of each of the plurality of markers;

correlating the location of each of the plurality of markers from the reference images with the location of each of the plurality of markers in the calibration image.

22. The method of clause 21, wherein the plurality of markers comprises lights.

23. The method of clause 21, wherein activating each of the plurality of markers occurs in sequence.

24. The method of clause 21, wherein one reference image is captured for each of the plurality of markers.

25. An apparatus, comprising:
   a camera having an initially unknown focal length;
   a first mirror and a second mirror being oriented with an initially unknown angle there between; and
   a reference device fixable relative to a subject, the reference device comprising at least three markers having positions fixed relative to each other;
   a computing device configured to perform the steps of:
      capturing an image containing a view of an object, a first reflection of the object in the first mirror, a second reflection of the object in the second mirror, and a third reflection of the first reflection in the second mirror;
      solving at least one camera parameter of the camera based on the image; and
      determining a distance from the camera to at least one point on the object.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

Figure 1A:
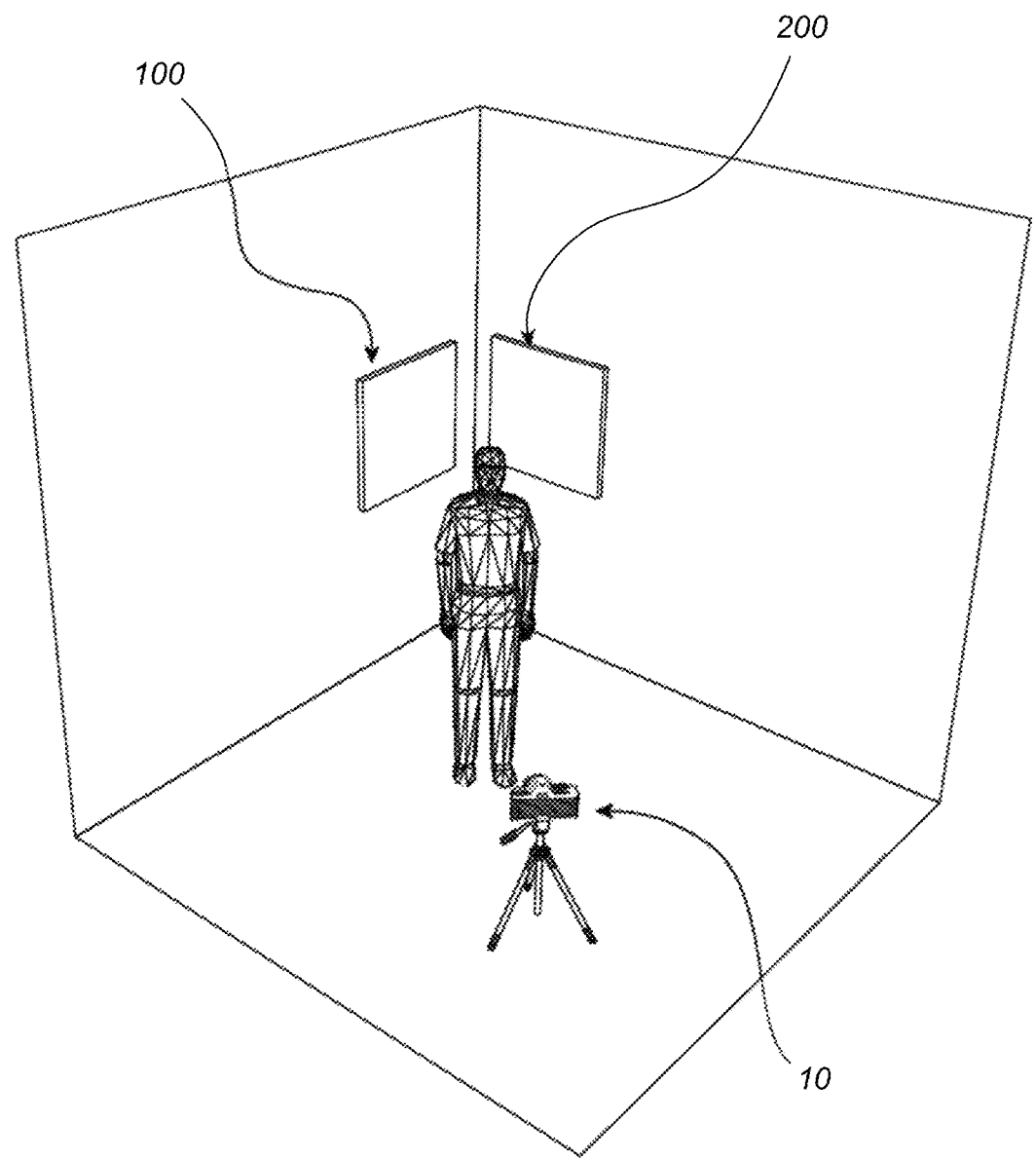
FIG. 1A shows a system construction.
Figure 1B:
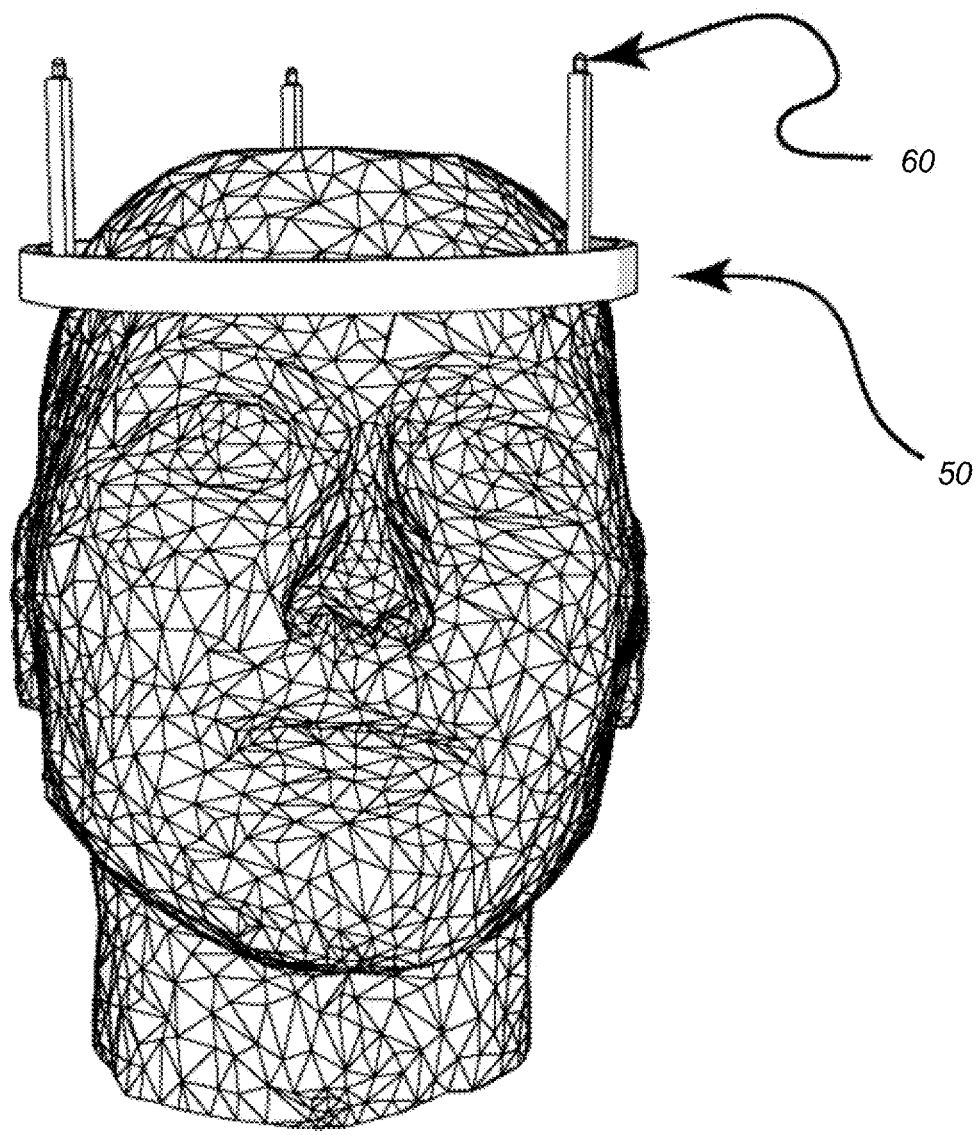
FIG. 1B shows a system comprising two mirrors and one camera.

According to some embodiments, disclosed herein is a system that uses a combination of hardware (e.g., a controller) and software (e.g., a set of algorithms) to recover a three-dimensional ("3-D") model of objects or human subjects (hereafter "subjects"). According to some embodiments, the system comprises a camera 10 and two stationary planar mirrors 100 and 200, as shown in FIG. 1A. Subjects may be placed between the mirrors 100 and 200. A reference device is provided, such as a helmet 50 fitted with a plurality (e.g., three) of markers 60 (e.g., LED lights, etc.), as shown in FIG. 1B. The reference device is fixed relative to the subject. By changing orientation of the subject and the reference device relative to the camera 10 (e.g., on a spin-chair or turn-table) subjects may reveal all sides to the camera 10, which are used by the disclosed algorithms to compute a 3-D model. According to some embodiments, the algorithm computes the geometric relationship among the mirrors 100 and 200, the camera 10 and different orientations of the subject and finally a 3-D model.

As used herein, "camera" means be any image viewing, capturing, transmitting, or recording device, including photo, video, film-based, digital, etc. One or more cameras may be used.

As used herein, "image" means any view or series of views of a subject from a perspective receiving information (light, electromagnetic radiation, etc.) transmitted directly or indirectly from the subject.

As used herein, "marker" means any device viewable, capturable, recordable, recognizable, identifiable, or distinguishable by the camera.

As used herein, "region" means any point, line, portion, section, area, or volume of a subject (including an object or markers) viewable on an image captured by a camera.

As used herein, "capture" or "capturing" means recordation, reception, manipulation, or transmission of an image with, by, or from a camera.

According to some embodiments, the present disclosure provides systems, devices, and methods having one or more of the following features:

According to some embodiments, no special imaging devices are required. General purpose cameras may be used in conjunction with the present disclosure.

According to some embodiments, the mirrors 100 and 200 assume no special shape or optical properties. General purpose mirrors, such as flat or planar mirrors, may be used in conjunction with the present disclosure.

According to some embodiments, no spatial constraints on the mirrors 100 and 200 or the camera 10 must be imposed. The mirrors 100 and 200 are not required to form a certain angle, and the camera 10 may be placed anywhere that allows the camera 10 to view the subject and the reflection of the subject from the mirrors 100 and 200.

According to some embodiments, no camera calibration procedures are needed. The algorithm recovers the camera parameters automatically.

According to some embodiments, knowledge or input of the relative positions of the markers 60 is not required. According to some embodiments, the positions of the markers 60 relative to each other does not change during the image capturing process.

According to some embodiments, the present disclosure provides substantial improvements in terms of speed and accuracy. The mirrors 100 and 200, revealing two indirect views in addition to a direct view of the subject, speed up the imaging process by providing sufficient information without full rotation of the subject. More views also provide more accurate 3-D reconstruction.

According to some embodiments, 3-D reconstruction is achieved by recovering the scene geometry, including the equations of the mirrors 100 and 200, the camera parameters and the position of the markers 60, which give the location and orientation of the subjects. After establishing the geometry, a volume intersection algorithm is applied to build a 3-D model of the subject.

Figure 1C:
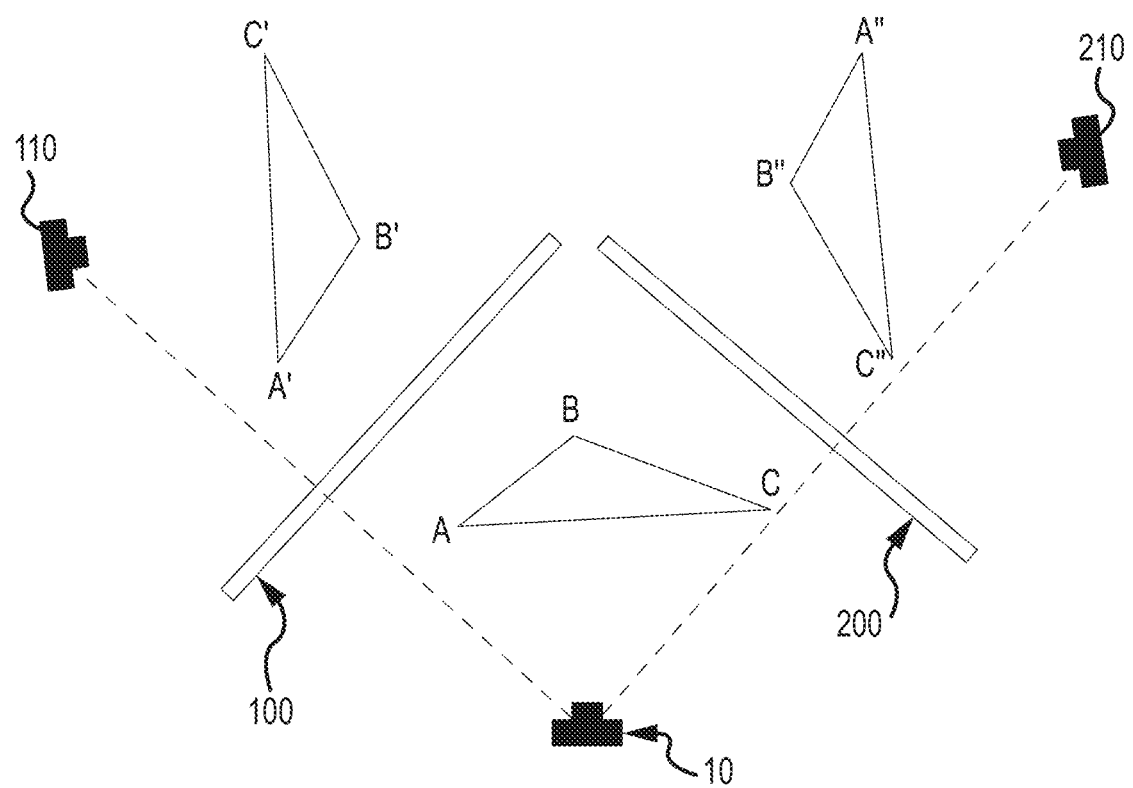
FIG. 1C shows an example of imaging geometry. According to some embodiments, each mirror induces a virtual camera (connected to camera by dashed line) that shares the same intrinsic parameters as the real camera. The scene geometry can be recovered from the three markers (ABC) and their mirror reflections (A'B'C' and A"B"C").

Each of first mirror 100 and second mirror 200 can be seen as producing a virtual camera 110 or 210, respectively, the parameters of which being identical to those of the real camera. Consequently, the problem of solving for unknowns is similar to finding the structure of the markers 60 and the camera parameters with a moving camera (FIG. 1C). In general, through the technique of "self calibration," given at least seven points, a solution is attainable but is not unique. Excessive markers may cause self-occlusion and make the correspondence problem intractable without human interaction.

According to some embodiments, with the insight of the special imaging geometry of the two mirrors 100 and 200, we can solve the problem definitely with as few as three markers 60 and as few as two views.

According to some embodiments, the present disclosure provides a simple, inexpensive, automated 3-D imaging system that will allow a physician to perform a rapid preoperative and postoperative 3-D analysis of the head and neck. A practicing anesthesiologist may use teachings of the present disclosure to predict difficult placement of a breathing tube during induction of general anesthesia and reduce anesthesia related mortality and morbidity. Certain head and neck 3-D features are characteristic of obstructive sleep apnea, teachings of the present disclosure may be applied to detect such a condition. Other applications based on acquired 3-D renderings may be served by the teachings of the present disclosure.

According to some embodiments, plastic or maxillofacial surgeons may apply the teachings of the present disclosure for preoperative modeling as well as follow up after the corrective surgery. Teachings of the present disclosure may improve the quality of reconstructions and patient satisfaction. Orthodontists may use teachings of the present disclosure for analysis of facial disproportion and growth prediction.

According to some embodiments, teachings of the present disclosure may also be used in a wide range of security applications that involve facial recognition. 3-D models may provide more accurate cranio-facial measurements than 2-D images and may increase the accuracy of performance in facial recognition applications.

3-D model acquisition systems include active systems and passive systems. Examples of active systems include laser range finders and structured-light systems. These systems employ special imaging devices and are usually expensive and difficult to operate. Further, active systems are invasive, in the sense that they shine laser or light onto subjects, which can cause safety concerns in clinic use. Examples of passive systems reconstruct 3-D models from multiple images of the subject. Current passive systems usually require tedious and fragile calibration process, which limits their use in clinics.

According to some embodiments, the teachings of the present disclosure provide a major benefit to the field by allowing use of the special imaging geometry of two fixed planar mirrors and a consumer grade camera.

According to some embodiments, where mirrors 100 and 200 are used, each orientation simultaneously provides at least three different views (one direct and two or more mirror reflections), which are taken by the camera 10. Simultaneously acquired different views provide a full 360° view of the subject with less than a full rotation of the subject (i.e., with a rotation of approximately 360°/(m+1), where m=the number of mirrors).

3-D reconstruction may be performed during (e.g., in real time) or after image acquisition. As used herein, the term "real time" shall be understood to mean the instantaneous moment of an event or condition, or the instantaneous moment of an event or condition plus short period of elapsed time used to make relevant measurements, optional computations, etc., and communicate the measurement, computation, or etc., wherein the state of an event or condition being measured is substantially the same as that of the instantaneous moment irrespective of the elapsed time interval. Used in this context "substantially the same" shall be understood to mean that the data for the event or condition remains useful for the purpose for which it is being gathered after the elapsed time period.

According to some embodiments, an algorithm solves for the camera parameters and the orientation(s) of the subject without any dedicated calibration process.

According to some embodiments, disclosed herein are the algorithms to solve the camera parameters and the positions of the markers 60, a process referred to herein as "self calibration." In particular, provided herein is disclosure relating to a case of two fixed mirrors. After the camera 10 and the markers 60 are solved, 3-D reconstruction of the subjects is performed using one or more of a range of methods. A specific signal may be used to control LED markers 60 and the camera 10 to solve for correspondence.

As used herein, the term "notation mirrors" refers to planar mirrors. As used herein, upper case letters indicate 3-D scene points and lower case letters indicate their corresponding images. As used herein, subscription denotes the reflection of a point. For example, when there are two mirrors, the reflection of a 3-D scene point A in the first mirror is denoted as $A_1$ and that of the second mirror $A_2$. The image of the point and the reflections is a, $a_1$ and $a_2$, respectively. As used herein, regular font indicates points, and bold face indicates vectors used to do calculations. For example, $b_1$ is the image point of $B_1$ and $b_1 = (ub_1, vb_1)^T$. A tilde to a vector denotes the same point in corresponding homogenous coordinates, e.g., $b_1 = (u_{b1}, v_{b1}, 1)^T$.

Self-Calibration: Camera Model

According to embodiments, disclosed is an apparatus including a camera 10 having an initially unknown focal length. A first mirror 100 and a second mirror 200 are oriented with an initially unknown angle there between. A reference device 50 is fixable relative to a subject, the reference device 50 comprising at least three markers 60 having positions fixed relative to each other. A computing device may be configured to perform the steps of: capturing an image containing a view of an object, a first reflection of the object in the first mirror 100, a second reflection of the object in the second mirror 200, and a third reflection of the first reflection in the second mirror 200. The computing device may be configured to solve at least one camera parameter of the camera 10 based on the image and determining a distance from the camera 10 to at least one point on the object.

With reference to a standard pin-hole camera, with its center of projection at the origin O, a z-axis aligned to the view axis, and the plane z=f being the image plane: a 3D point A in this coordinate system is projected to the screen point $\tilde{a} = (u, v, 1)^T$, expressed in homogeneous coordinates, by the following equation:

$$\tilde{a} \simeq \begin{pmatrix} f & 0 & u_0 \\ 0 & \alpha f & v_0 \\ 0 & 0 & 1 \end{pmatrix} A \simeq KA, \quad \text{(Eq. 1)}$$

where $\simeq$ indicates equality up to a scale factor. The matrix K of the focal length f, aspect ratio $\alpha$ and the principal point $(u_0, v_0)^T$, is called the intrinsic matrix. The intrinsic matrix contains the intrinsic parameters, including focal length f, aspect ratio $\alpha$ and the principal point $(u_0, v_0)^T$. The principal point is where the z-axis intersects with the imaging plane and it is close to or at the center of the image.

According to some embodiments, the self-calibration algorithm computes both the position of the 3-D points (structure) and the matrix K (camera calibration) from only their images acquired.

Self-Calibration: The Basic Equation of Mirror Imaging

Figure 2:
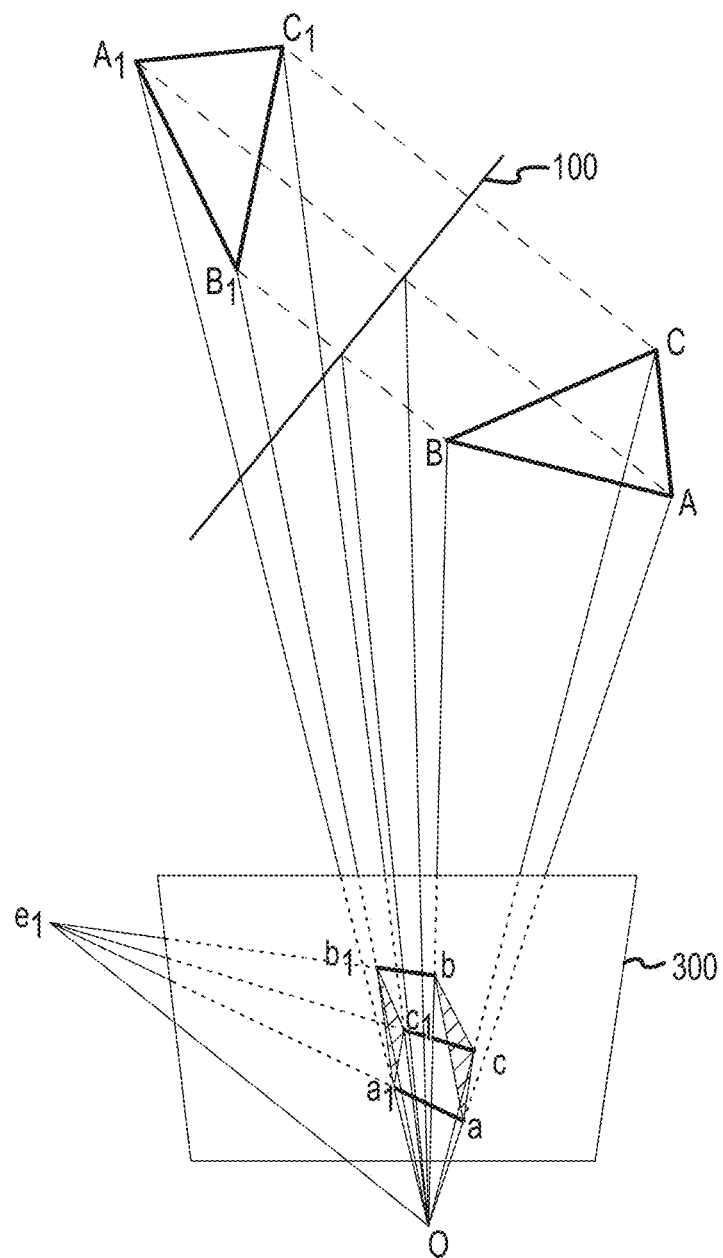
FIG. 2 shows elements of mirror imaging. According to some embodiments, the mirror lines (a line connecting a point A and its reflection $A_1$) are parallel to the normal vector of the mirror surface. The image of the mirror lines intersect at $e_1$, the vanishing point of the direction of the normal vector.

According to some embodiments, an imaging geometry of a camera 10 and a single first mirror 100 is depicted in FIG. 2. The first mirror 100 is described by a plane equation in the coordinate system defined above: $n_1 \cdot x + d_1 = 0$, where $n_1$ is the normal vector of the mirror plane. The direction of the normal vector is fixed to point toward the camera 10, wherein $d_1$ is always positive.

According to some embodiments, an imaging process is captured by the following basic equations. Let point $A = (x_A, y_A, z_A)$ and those of its mirror reflection $A_1 = (x_{A1}, y_{A1}, z_{A1})$, similarly for points B and C. The image of A is $\tilde{a}$, thus, $$A = z_A K^{-1} \tilde{a}. \quad \text{(Eq. 2)}$$

Because $A_1$ is the mirror reflection of A, $$A_1 = A - 2n_1(A^T n_1 + d_1). \quad \text{(Eq. 3)}$$

Multiplying K on both sides of Eq. 3, the relationship between the images of A and its mirror reflection is revealed, $$\tilde{a}_1 \simeq K(A - 2n_1(A^T n_1 + d_1)), \quad \text{(Eq. 4)}$$

or $$\begin{aligned}\tilde{a}_1 &\simeq z_A \tilde{a} - 2Kn_1(z_A \tilde{a}^T K^{-T} n_1 + d_1) \\ &\simeq z_A \tilde{a} - 2Kn_1(z_A \tilde{a}^T K^{-T} K^{-1} K n_1 + d_1) \\ &\simeq z_A \tilde{a} - 2z_A \beta^2 \tilde{e}_1(\tilde{a}^T C \tilde{e}_1) - 2\beta d_1 \tilde{e}_1,\end{aligned} \quad \text{(Eq. 5)}$$

where $Kn_1 = \beta e_1$ and $e_1$ is the epipole of a virtual camera induced by the first mirror 100 and $\beta$ is a scale factor determined by f. The 3×3 matrix $C = K^{-T} K^{-1}$ is the image of the absolute conic ("IAC"). Eq. 5 is known as the basic equation of mirror imaging, which constrains all the quantities, including the structure (depth) of 3-D points, the intrinsic parameters (through the IAC) of the camera 10 and the position and orientation of the first mirror 100. Geometrically, the equation shows that the images of a point and its mirror reflection (e.g., $a_1$ and a) are collinear with the epipole $e_1$, which is exactly the epiolar geometry of traditional two-camera stereo.

Self-Calibration: Solving the Basic Equation

According to some embodiments, based on Eq. 5, a counting argument can be performed for how many points and views are needed to solve both the structure of the points and the intrinsic matrix of the camera. In the simplest case, the focal length f is the only unknown intrinsic parameter (i.e., $\alpha = 1$ and $(u_0, v_0)$ is the center of the imaging plane). With a single mirror and fixed N scene points, N unknowns exist common to all views: f and N-1 depth values of the N points. According to some embodiments, N-1 (instead of N) depth values are unknown because without a prior knowledge of the scale, e.g., in inches, the 3-D information can be reconstructed up to a scale factor. According to some embodiments, the depth of the first point is chosen as the unit length. Each view introduces three more unknowns, the orientation of the mirror $n_j$ and distance of the mirror, $d_j$, j=1 . . . M, which provides 2N basic equations (Eq. 5). These 2N equations are not all independent. This is evident that given the epipolar line $e_1$ a and u of $\tilde{a}_1 = (u, v, 1)^T$, v is determined by the intersection of the epipolar line and the horizontal line (FIG. 2). One point is not enough, no matter how many mirror views exist. With N points and M mirror positions, the number of independent equations is M(N+2) and the number of unknowns is 3M+N. To reach a solution, enough views or points are needed such that M(N+2)≥3M+N (e.g., when there are 3 points, at least 2 views are needed).

According to some embodiments, the system utilizes two fixed mirrors and moving scene points. With M views, 6 unknowns exist from the mirrors 100 and 200 and the camera 10: $n_1$, $n_2$, $d_2$, and f, and N depth values of the N points. Because the mirrors 100 and 200 are fixed, $d_1$ is used as the global scale factor. Each (double-mirror) view gives 2N independent equations, e.g., $f_1(ua_1, ua)=0$ and $f_2(ua_2, ua)=0$, except the first view has 8+2(N−2) independent equations. It is required to achieve 2MN+4≥6+MN or MN≥2. One corollary is that with one (double-mirror) view, only 2 points are needed to solve the structure and the camera 10, whereas in general self-calibration setups, one needs 7 points. The reason is that the virtual cameras undergo a constrained motion (reflection) and that limits the dimensionality of the solution space.

Given enough views and points, the maximum likelihood estimate ("MLE") of the camera and points is found by minimizing the following objective function, assuming the measurement noise on the image is Gaussian:

$$\mathscr{F} = \sum_{i=1}^{M} \sum_{j=1}^{N} \delta_h(\tilde{p}_{ij}, z_{pj}\tilde{p}_j - 2z_{pj}\beta^2 \tilde{e}_i(\tilde{p}_j^T C\tilde{e}_i) - 2\beta d_i \tilde{e}_i), \quad \text{(Eq. 6A)}$$

where $\delta_h((x, y, z)^T, (u, v, w)^T)) = \|(x/z, y/z)^T - (u/w, v/w)^T\|$ is the un-homogenized distance between two vectors $(x, y, z)^T$ and $(u, v, w)^T$.

By nonlinear optimization, an initial guess of the solution may be produced to help the optimization converge to the right answer. The special geometry of mirror imaging gives a linear solution of the camera parameters and the structure of the points.

The Geometry of Mirror Imaging: Single Mirror

The relationship between a point and its mirror reflection is simple, i.e., the line $AA_1$ defined by a point A and its reflection $A_1$ is perpendicular to the mirror surface and the mirror bisects $AA_1$. The former is an Euclidean property, and the latter an affine one.

FIG. 2 depicts the case where there is a single mirror 100 and three scene points, A, B, and C. The normal vector of the mirror 100 is $n_1$. $AA_1$ and $BB_1$ are parallel to $n_1$. On the image plane 300, $aa_1$ and $bb_1$ intersect at $e_1$, which is the vanishing point of the direction of $n_1$. Therefore, from the image of two points and their mirror reflections, the normal vector, or the orientation, of the mirror in pixel values can be determined. Note that $e_1$ is also the image of the infinity point of the line $AA_1$ and $BB_1$. Let the intersection of $AA_1$ and the mirror be $IA_1$. Because the mirror bisects $AA_1$, the four points $\infty, A_1, A$, and $IA_1$ form a harmonic sequence. Thus, the cross ratio $[ia_1, a; a_1, e_1] = [IA_1A; A_1, \infty] = ½$, from which the image of $IA_1$, $ia_1$ can be located. Similarly, the images of points $IB_1$ and $IC_1$ can be located.

The triangles $\Delta abc$ and $\Delta a_1 b_1 c_1$ form a Desargues' configuration (FIG. 2). In other words, the intersections of corresponding sides of the two triangles are collinear. This line is the image of the intersection of the plane defined by A, B, and C and the mirror 100.

The Geometry of Mirror Imaging: Two Mirrors in General Position

According to some embodiments, two mirrors views are provide, either from two physical mirrors or by placing one mirror to generate a second view. When there are two mirror views, enough constraints are provided to solve the system.

Let $A_1$ be the reflection of point A in first mirror 100. Let $A_{12}$ be the reflection of $A_1$ in second mirror 200. Let $B_1$ be the reflection of point B in first mirror 100. Let $B_{12}$ be the reflection of $B_1$ in second mirror 200. The planes $AA_1A_{12}A_2$ and $BB_1B_{12}B_2$ are parallel to each other. Let $I_{A12}I_{A2}$ be the line formed by the intersection of $AA_1A_{12}A_2$ with second mirror 200. Let $I_{B12}I_{B2}$ be the line formed by the intersection of $BB_1B_{12}B_2$ with second mirror 200. Accordingly, $I_{A12}I_{A2}$ and $I_{B12}I_{B2}$ are parallel (see FIG. 3). The image of these two lines is computed using the harmonic sequence described above (Eq. 6A). For example, to compute $i_{A2}$, the image of $I_{A2}$, the following equation is solved:

$$[i_{A_2}, a; a_2, e2] = \frac{1}{2}, \quad \text{(Eq. 6B)}$$

where the only unknown quantity is $i_{A2}$. The images of other intersection points can be solved similarly.

Figure 3:
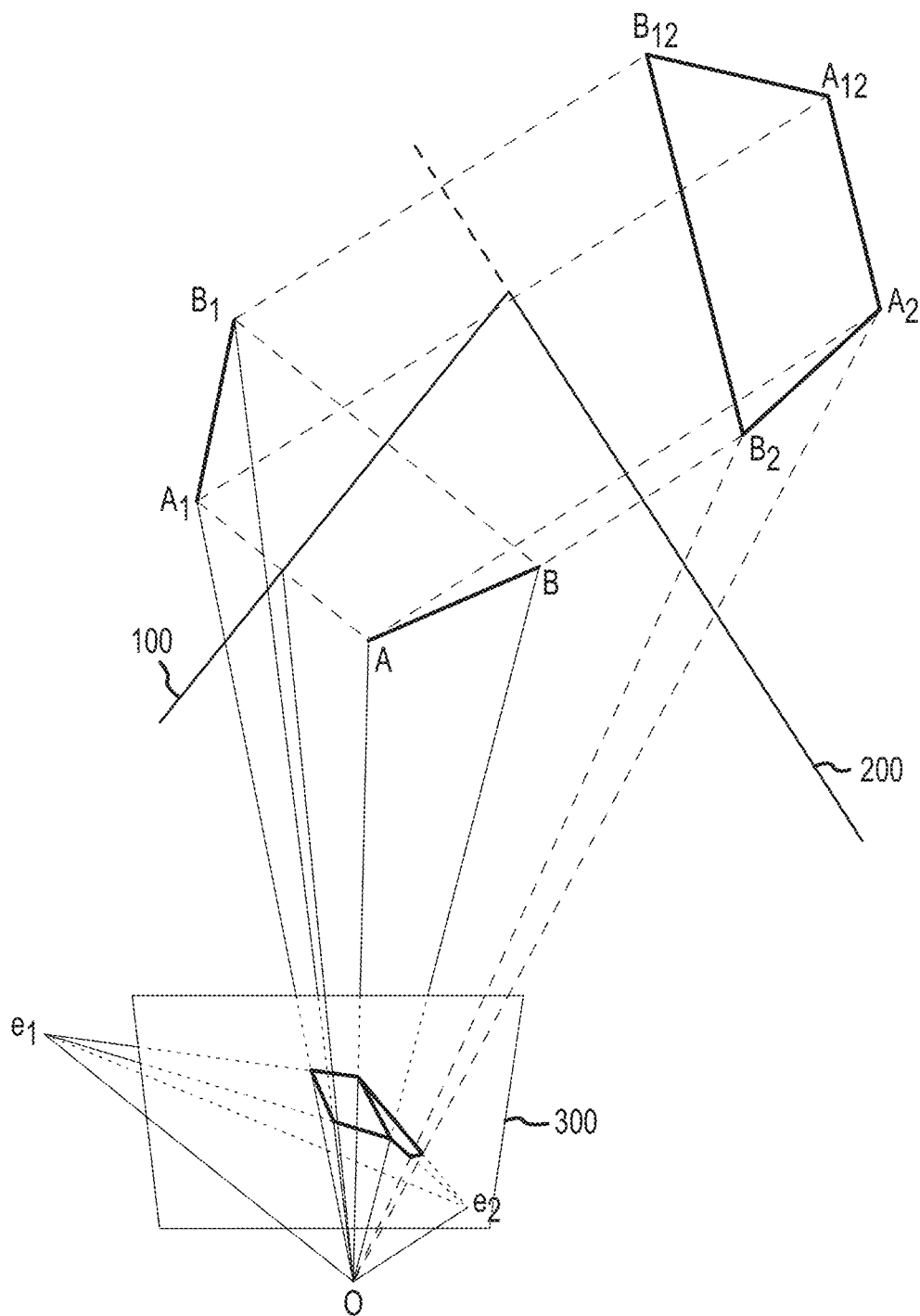
FIG. 3 shows a reflection of a reflection. According to some embodiments, $A_{12}$ is the reflection of $A_1$, which is the reflection of point A in a first mirror and in a second mirror. That $A_2 A_{12} \| B_2 B_{12}$ gives a constraint that enables one to compute the focal length of the camera.
Figure 4:
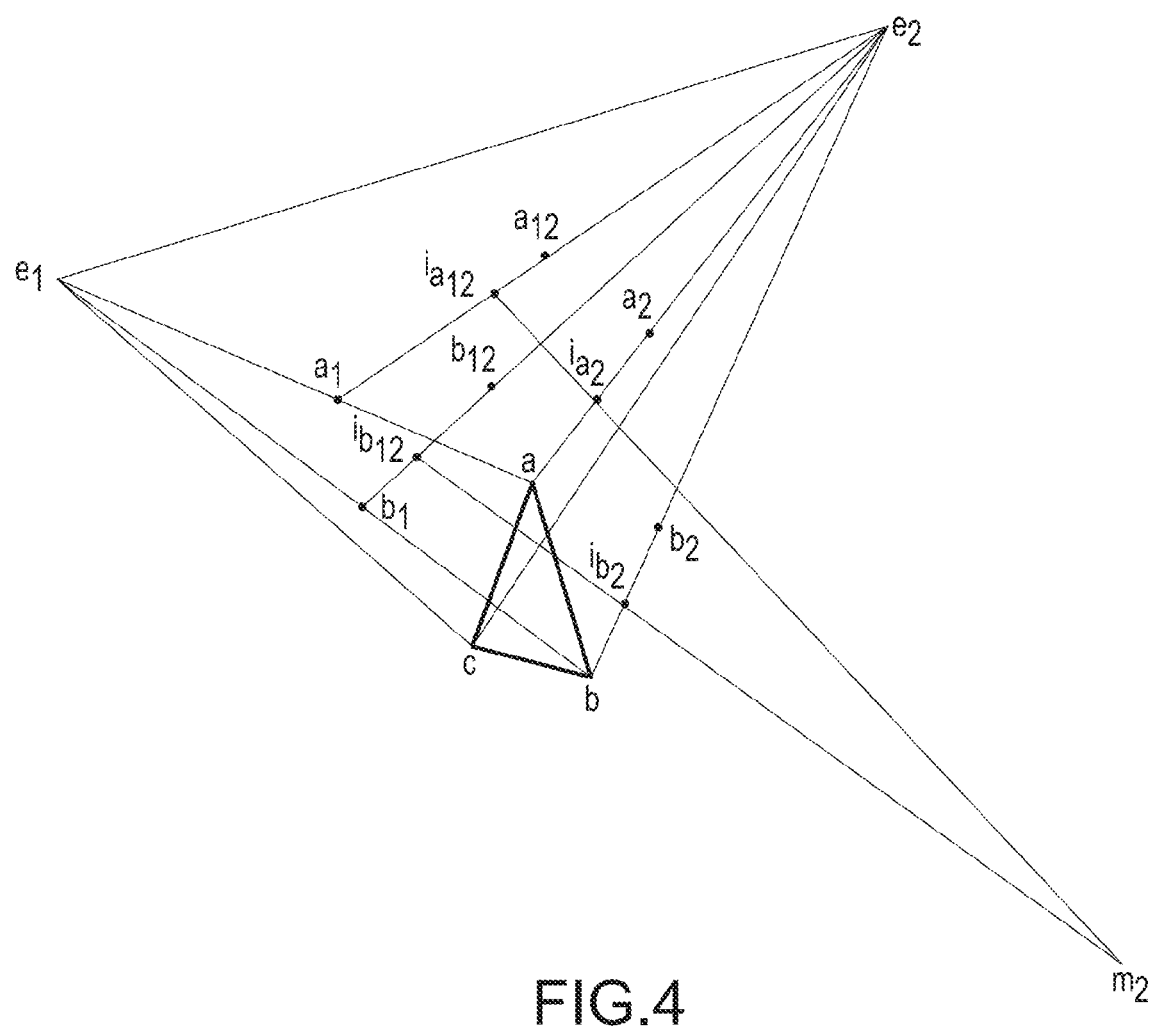
FIG. 4 shows an illustration from which one can compute the camera focal length. According to some embodiments, the lines $i_{a12} i_{a2}$ and $i_{b12} i_{b2}$ are images of two parallel lines and hence intersect at $m_2$, which is orthogonal to $e_2$. The orthogonality provides a constraint to solve for the focal length of the camera.

According to some embodiments, to perform a self-calibration method, a Euclidean property on the image plane is found. Both lengths (up to a global scale factor) and angles are preserved by Euclidean transformations. In the case of a planar mirror, orthogonality is present: the normal of the mirror is perpendicular to any directions on the mirror. The normal direction is given by its vanishing point. A direction on the mirror is defined by two or more parallel lines. The two lines on second mirror 200, $I_{A12} I_{A2}$ and $I_{B12} I_{B2}$ provide that (FIG. 3). On the image plane 300. The image $i_{a12} i_{a2}$ and $i_{b12} i_{b2}$ intersect at $m_2$, which is the vanishing point of the direction defined by the two lines, as shown in FIG. 4. Let the principal point be $o=(u_o, v_o)^T$. That the direction $e_2$ and $m_2$ are orthogonal to each other gives an equation of the focal length of the camera 10:

$$\begin{pmatrix} u_{m_2} - u_o \\ v_{m_2} - v_o \\ f \end{pmatrix} \cdot \begin{pmatrix} u_{e_2} - u_o \\ v_{e_2} - v_o \\ f \end{pmatrix} = 0 \quad \text{(Eq. 7)}$$

Assuming a third point c, the lines $i_{a12} i_{a2}$ and $i_{c12} i_{c2}$ intersect at $l_2$, which is orthogonal to $e_2$ by the same reasoning. The line $l_2 m_2$ is the horizon corresponding to $e_2$ (i.e., all directions parallel to second mirror 200). Erect a line, called the zenith line, from $e_2$ perpendicular to $l_2 m_2$ and the principal point is on the zenith line. If the images of the reflections in first mirror 100 of the reflections in second mirror 200 are available, the horizon of the $e_1$ can be determined as well, and the intersection of two zenith lines is the principal point. By this calculation, the camera is solved.

The Geometry of Mirror Imaging: Two Orthogonal Mirrors

According to some embodiments, two mirrors 100 and 200 are provided at right angles. When the two mirrors 100 and 200 are placed at right angles to each other, the self-calibration algorithm (Eq. 7) becomes $$\begin{pmatrix} u_{e_2} - u_o \\ v_{e_2} - v_o \\ f \end{pmatrix} \cdot \begin{pmatrix} u_{e_1} - u_o \\ v_{e_1} - v_o \\ f \end{pmatrix} = 0, \quad \text{(Eq. 8)}$$

from which we can solve for the focal length.

The Geometry of Mirror Imaging: Solving for Structure of the Marker Points

Figure 5:
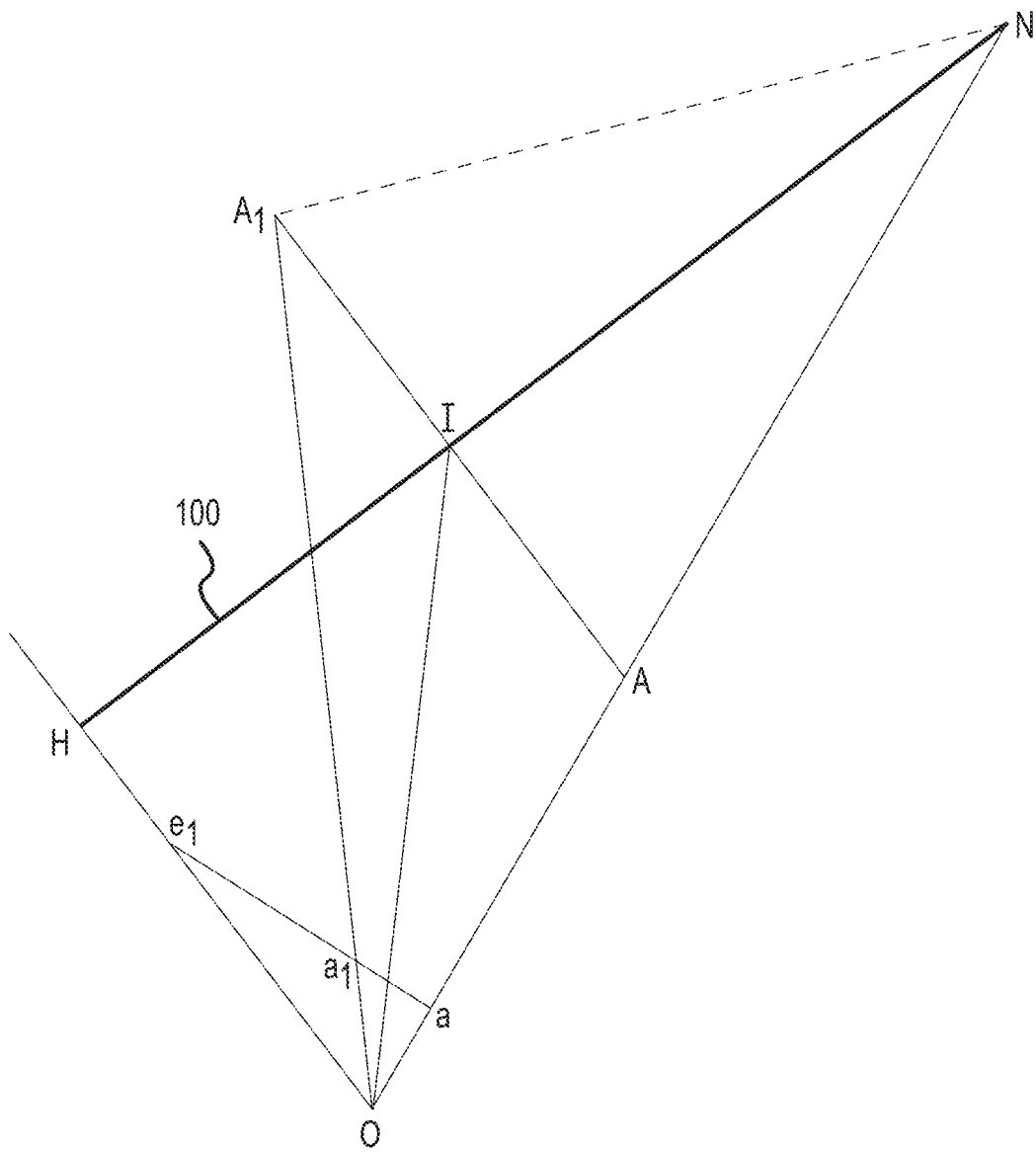
FIG. 5 shows an illustration from which one can compute the depth of points. According to some embodiments, the depth of point A, OA, is solved from the triangles $\Delta OA_1 N$ and $\Delta OA_1 A$, in terms of $OH=d_1$.

With the camera parameters solved, angles from image points can be measured. Let $\alpha = \angle AOA_1 = \angle A_1ON = \angle e_1Oa_1$ and $\beta = \angle HOA = \angle HON = \angle e_1Oa$. Because $OH \parallel AA_1$, as shown in FIG. 5, this gives $$\frac{AN}{ON} = \frac{AI}{OH}, \quad \text{(Eq. 9)}$$

where OH is the distance from the center of projection O to first mirror 100 (i.e., $OH = d_1$. In $\Delta ONA_1$, by the law of sines, this gives $$\frac{\sin\alpha}{\sin(2\beta - \alpha)} = \frac{A_1N}{ON} = \frac{AI}{d_1}, \quad \text{(Eq. 10)}$$

from which is derived $$AI = \frac{d_1 \sin\alpha}{\sin(2\beta - \alpha)}. \quad \text{(Eq. 11)}$$

Applying the law of sines in $\Delta OAA_1$, this gives $$\frac{AO}{\sin(\beta - \alpha)} = \frac{2AI}{\sin\alpha}, \quad \text{(Eq. 12)}$$

where AO gives the depth of point A in term of $d_1$. The depth of the other points can be solved similarly.

Since a similar equation holds between OA and $d_2$, the distance from O to second mirror 200, $d_2$ can be expressed in terms of $d_1$ as well. Therefore, $d_1$ can be used as a ruler to measure all distances in the scene, and the computed structure can be determined up to a global scale factor. According to some embodiments, the structure can be transformed to a full metric one by measuring, e.g., the absolute distance between markers A and B, which can be fixed, determinable, or known. According to some embodiments, any or all other measurements may be converted from a global scale factor to a metric value based on a calculated conversion for two known points from their global scale factor to their known metric value.

Accordingly, by capturing a first image while a marker set, comprising a plurality of markers, and an object are in a first orientation relative to the camera; and a second image while the marker set and the object are in a second orientation, different than the first orientation, relative to the camera, a number of data points are provided. Each of the first image and the second image may show a direct view of (i) the marker set, each of the markers having a fixed position relative to every other of the markers and (ii) the object; and a first reflection view of a first reflection of the markers and the object in a first mirror.

A first indicator, of the first orientation, may be determined based on (i) the direct view of the marker set in the first image, (ii) the first reflection view of the marker set in the first image, (iii) a known distance between two of the markers, and (iv) a focal length of the camera, Similarly, a second indicator, of the second orientation may be determined based on (i) the direct view of the marker set in the second image, (ii) the first reflection view of the marker set in the second image, (iii) the known distance between two of the markers, and (iv) the focal length of the camera.

Where the focal length is initially unknown, it can be calculated, as disclosed herein. Therefore, the first indicator, of the first orientation, may be determined based on (i) the direct view of the marker set in the first image, (ii) the first reflection view of the marker set in the first image, (iii) the second reflection view of the marker set in the first image, (iv) the third reflection view of the marker set in the first image, and (v) a known distance between two of the markers. Similarly, the second indicator, of the second orientation, may be determined based on (i) the direct view of the marker set in the second image, (ii) the first reflection view of the marker set in the second image, (iii) the second reflection view of the marker set in the second image, (iv) the third reflection view of the marker set in the second image, and (v) the known distance between two of the markers.

The methods described herein may be performed with respect to any number of images and orientations. For example, 1, 2, 3, 4, 5, 6, 7, 8, 9, 10, or more images may be captured, each corresponding to the marker set and the object in a respective orientation, different from the orientation in any other image.

3-D Model Reconstruction

According to some embodiments, the algorithm updates the position of the three markers 60 periodically or continuously, and the pose of the subject is computed by absolute or relative orientation from the three markers 60. Each image thus provides one, two, or more calibrated views of the subject. 3-D reconstruction methods can be used to recover a 3-D model of the subject based on the calibrated images.

For example, a three-dimensional model of the object may be rendered based on (i) the direct view of the object in the first image, (ii) the first reflection view of the object in the first image, (iii) the first indicator, (iv) the direct view of the object in the second image, (v) the first reflection view of the object in the second image, and (vi) the second indicator.

According to some embodiments, volume intersection techniques may be employed to perform 3-D reconstruction. The silhouette of an object in one view, together with the camera, defines a generalized cone. Intersecting all the generalized cones from multiple views gives a 3-D model of the object. Non-limiting examples of volume intersection techniques are found in W. N. Martin and J. K. Aggarwal. Volumetric description of objects from multiple views. *IEEE Transactions on PAMI*, 5:150-158, 1983.

According to some embodiments, Octree based methods and techniques may be employed to perform 3-D reconstruction. Instead of constructing the generalized cones, the algorithms divide the space into voxels, which are projected to each image and are tested whether they belong to the object. Octrees are used to efficiently sample the space. Non-limiting examples of Octree based methods are found in M. Potmesil. Generating octree models of 3D objects from their silhouettes in a sequence of images. *CVGIP*, 40:1-29, 1987 and R. Szeliski. Rapid octree construction from image sequences. *CVGIP:Image Understanding*, 58(1):23-32, July 1993.

According to some embodiments, space carving techniques may be employed to perform 3-D reconstruction.

Similar to Octree based methods, space carving algorithms also use the color information. Non-limiting examples of space carving techniques are found in K. Kutulakos and S. Seitz, A theory of shape by space carving, In *Proceedings of International IEEE Conference on Computer Vision*, page 307, 1998.

Establishing Correspondences

Reference is made to the article: Bo Hu, It's All Done with Mirrors: Calibration-and-Correspondence-Free 3D Reconstruction, In *Proceedings of* 2009 *Canadian Conference on Computer and Robot Vision*, pages 148-154, Kelowna, BC, May 2009, the entirety of which is incorporated herein by reference, as if fully set forth herein. It has been shown that the supporting lines defined by the convex hull of the image points intersect at the epipole. With one moving mirror, the convex hull can be computed easily and the correspondences between the image of the scene points and their mirror reflections can be determined by the epipole. When there are two or more mirrors, the convex hull of all the image points can no longer provide the supporting lines of each mirror, which complicates the task to determine the correspondences automatically.

Figure 6:
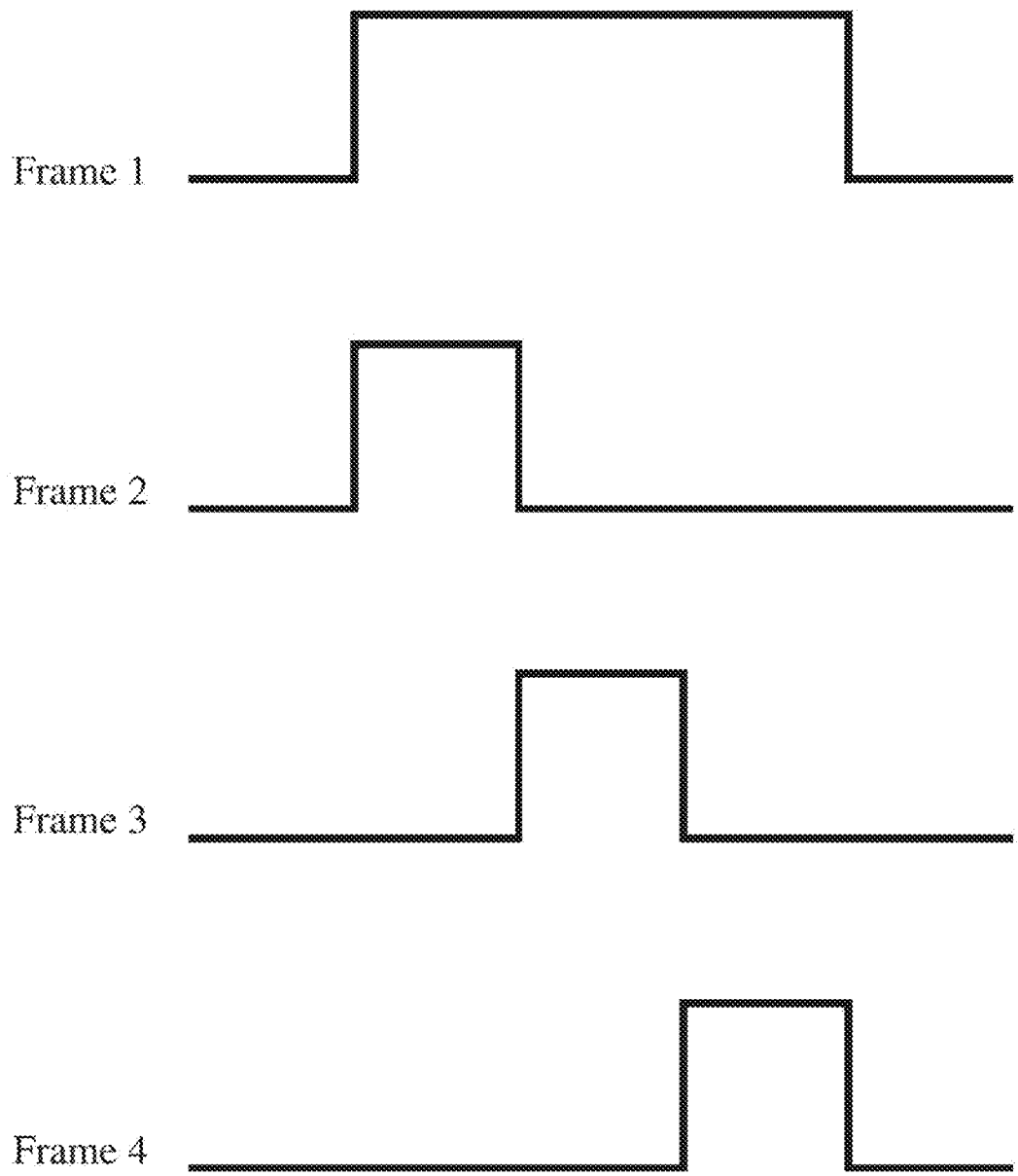
FIG. 6 shows a wave form of strobing LED markers. According to some embodiments, the LED markers are turned on simultaneously in the first frame and then individually in the following three frames. The first frame is used to perform the self-calibration and frames 2-4 are used to establish correspondences of the markers and their mirror reflections.
Figure 7:
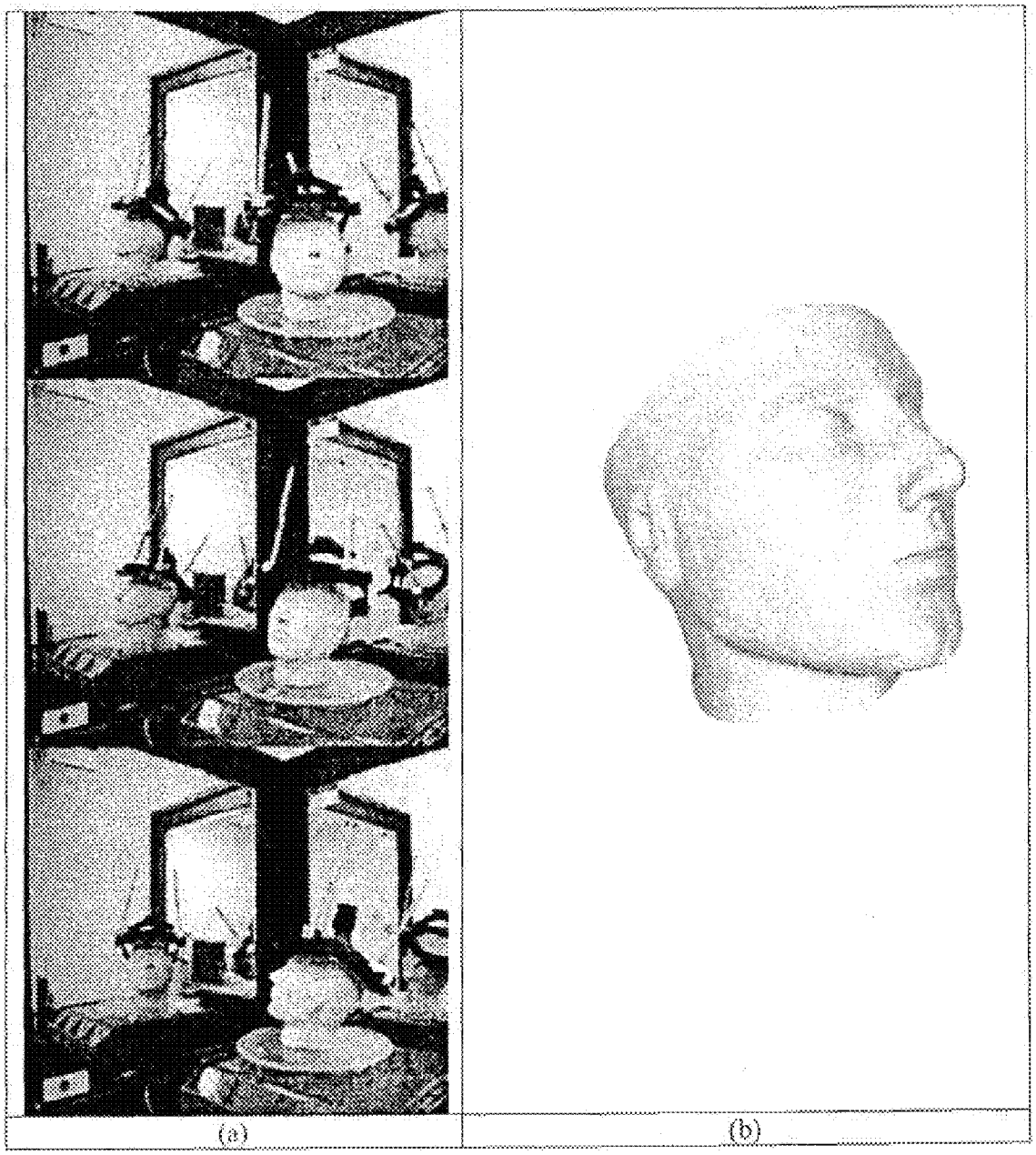
FIG. 7 shows an example of a reconstructed 3-D model. (a) The left panel shows the three images used, and (b) the right panel shows the reconstruction.

According to some embodiments, a controller is used to strobe LED markers 60 sequentially and the on/off strobing signal triggers the shutter of the camera 10. The correspondence of each marker 60 is extracted from each strobe image and the self-calibration is done by combining the correspondences from three consecutive frames. However, the subject may move in between the strobes, resulting misalignment of markers 60 among the three frames and consequently inaccurate calculation of the pose. Increasing the strobing frequency is limited by how fast specific cameras can operate. According to some embodiments, an extra phase is introduced, where all three markers 60 are turned on before strobing individual markers (see FIG. 6). According to some embodiments, the self-calibration is done only with the first frame (i.e., calibration image), where all the markers 60 are captured at the same time and therefore in a valid state. Each of the markers may be activated simultaneously for the captured calibration image. The later three frames (i.e., reference images) are used to help to identify each marker 60 in the first frame. Each of the markers may be activated separately for each captured reference image. The offset, if any, between the later frames and the first frame will be small. The location of each of the markers 60 from the reference images are correlated with the location of each of the markers 60 in the calibration image.

External Calibration

Some embodiments of the present disclosure employ two mirrors 100 and 200 to perform self-calibration (i.e., internal calibration) to compute the focal length of the camera 10 by at least one of the mirrors showing the reflection of the target object in the other mirror. Alternatively, according to some embodiments of the present disclosure, calibration may be performed without any special limitation on the positions of the mirror(s) 100 and/or 200 and the camera 10. A method of external calibration is disclosed to compute the distance of the mirror(s) 100 and/or 200 to the camera 10, specifically, though the application of Desargues' configuration (FIG. 2).

According to some embodiments, with a single mirror moving around the target object, an algorithm establishes point correspondences automatically. This algorithm provides a more flexible and robust approach that can see wide applications in multimedia production, gaming and consumer products.

Figure 8:
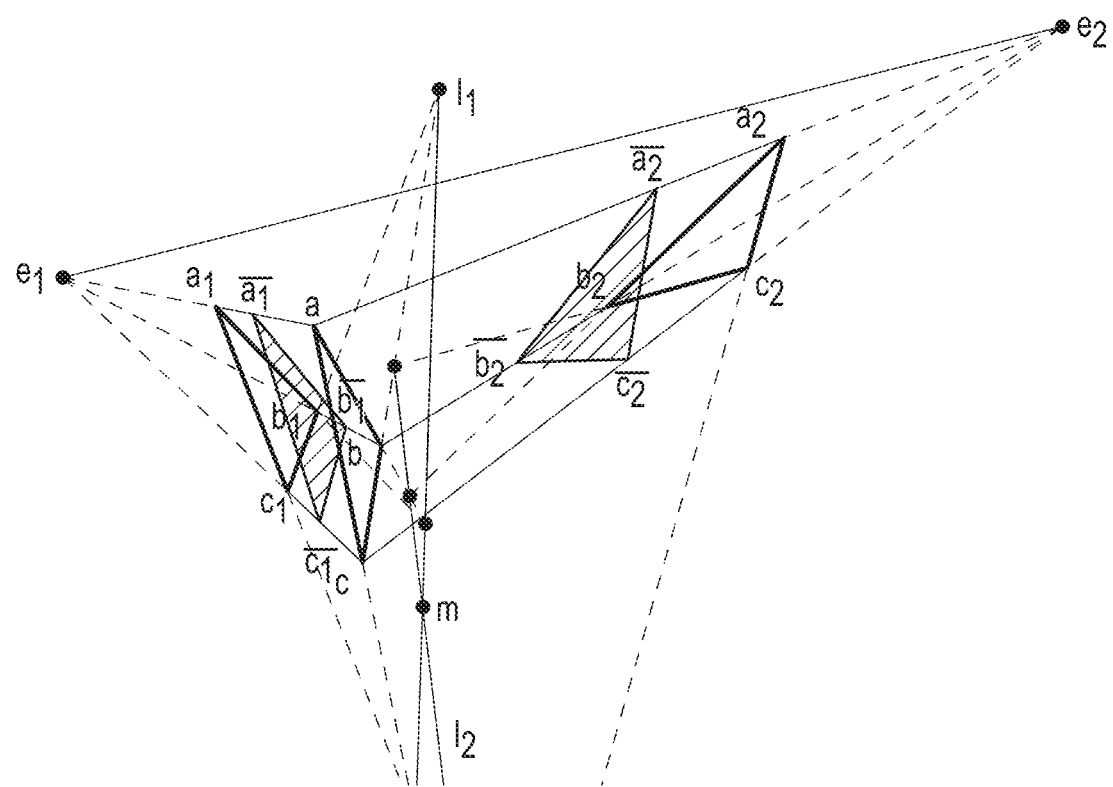
FIG. 8 shows an illustration from which one can computer the camera focal length. The triangle abc is the image of ABC on the world plane and $a_1 b_1 c_1$ and $a_2 b_2 c_2$ are the images of the reflections in a first mirror and in a second mirror, respectively. The point $e_1$ and $e_2$ are the vanishing points of the normal direction of the first mirror and the second mirror.

According to some embodiments, FIG. 8 shows the case of two-mirror views, either from two fixed mirrors, or a moving mirror at two different positions. Let A, B, and C (not shown) be three arbitrary points. Their reflection in the two mirrors 100 and 200 are $A_1B_1C_1$ and $A_2B_2C_2$, respectively. The image of these points are abc, $a_1b_1c_1$ and $a_2b_2c_2$. As described herein, the image of the middle point of $AA_1$, for example, may be computed using harmonic sequences. The image of the middle points of $AA_1$, $BB_1$, and $CC_1$, denoted as $\overline{a_1}$, $\overline{b_1}$, and $\overline{c_1}$, respectively, are on the first mirror 100.

The triangle $\Delta ABC$ and its mirror reflection $\Delta A_1B_1C_1$ are in perspective, with the center of the perspectivity at infinity. Consequently, their images $\Delta abc$ and $\Delta a_1b_1c_1$ are in perspective as well and the center is the epipole $e_1$. By Desargues theorem, the intersection of corresponding sides of the two triangles are collinear. The line $l_1$, constructed synthetically or computed algebraically, is the image of the intersection of the mirror plane of the mirror 100 and the plane defined by points A, B, and C. The line $l_2$, constructed synthetically or computed algebraically, is the image of the intersection of the mirror plane of the mirror 200 and the plane defined by points A, B, and C. The intersection of $l_1$, $l_2$, and m, is the image of the intersection of the two mirror planes and the ABC plane.

The point $e_1$ and $e_2$ are the epipoles of the virtual cameras 110 and 210 induced by the two mirrors 100 and 200. They are also the vanishing points of the normal vectors of the two mirrors. The line $e_1e_2$ is the vanishing line of the camera plane, so called because it is defined by the center of projection o, and the epipoles of the virtual cameras induces by the mirrors 100 and 200. The vanishing point $e_1^\perp$ is the direction that is perpendicular to $oe_1$ on this plane. Similarly $e_2^\perp$ is perpendicular to $oe_2$. Both $e_1^\perp$ and $e_2^\perp$ can be easily expressed as a function of the focal length and principal point. If one finds a constraint of these two unknown points, one can solve for the internal parameters of the camera 10. The intersection of $\overline{a_1} e_2^\perp$ and $\overline{a_2} e_1^\perp$, $m_a$, and the intersection of $\overline{b_1} e_2^\perp$ and $\overline{b_2} e_1^\perp$, $m_b$, are collinear with m. In other words, the determinant $$|mm_am_b|=0. \qquad (Eq. 13)$$

With two mirror views and assuming a known principal point, the above equation gives a quartic equation of the focal length. With more views, we can solve both the focal length and the principal points.

As described above, the line $l_1$ is the image of the intersection of first mirror 100 and the plane ABC. If the mirror moves along its normal direction, its vanishing point remains the same. However, $l_1$ will change as the mirror moves along its normal direction. Thus, $l_1$ provides a relative distance measurement of each mirror position and a change in $l_1$ is proportionate to a change in the position of the mirror position along its normal direction. After solving the internal camera parameters, one can compute the relative mirror distances.

By labeling the image points, it is possible to perform the calculation described above. If the mirror views are generated from a single moving mirror, a simple algorithm may be used to label all the image points. Let $$\{p_i^j\}, i=1 \ldots N, j=1 \ldots M \qquad (Eq. 14)$$

represent N points in M images. For concreteness, assume there are three world points, A, B, and C. Thus, $$\{a,b,c\} = \bigcap_{j=1}^{M} \{p_i^j\}. \qquad (Eq. 15)$$

In each view, $$j, \{a^j, b^j, c^j\} = \{p_i^j\} \setminus \{a,b,c\}. \qquad (Eq. 16)$$

Given that S={a, b, c} and Sj={a$^j$, b$^j$, c$^j$}, one can label individual points. One can compute the convex hull as S∪S$_j$={a, b, c, a$^j$, b$^j$, c$^j$}. The edge of the convex hull that connects one or more points from S and S$_j$ identifies a pair of correspondences. In general, there are two such edges, whose intersection is e$_j$, from which the rest of the correspondences can be found.

Reference is made to the article: Bo Hu, Christopher Brown, and Randal Nelson, *The geometry of point light source from shadows*, Technical Report 810, Computer Science Department, University of Rochester, June 2004, the entirety of which is incorporated herein by reference, as if fully set forth herein.

The processes described herein can be stored in a memory of a computer system as a set of instructions to be executed. In addition, the instructions to perform the processes described above could alternatively be stored on other forms of machine-readable media, including magnetic and optical disks and related media. For example the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.).

As used herein, the word "module" refers to logic embodied in hardware or firmware, or to a collection of software instructions, possibly having entry and exit points, written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is contemplated that the modules may be integrated into a fewer number of modules. One module may also be separated into multiple modules. The described modules may be implemented as hardware, software, firmware or any combination thereof. Additionally, the described modules may reside at different locations connected through a wired or wireless network, or the Internet.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

For example, a machine-readable medium is disclosed, according to embodiments. The machine-readable medium may contain machine-readable instructions for causing a processor to execute methods according to embodiments of the present disclosure.

By further example, a computer implementation system is disclosed, according to embodiments. The computer implementation system may include a capturing module configured to capture, from a camera and by a processor, a first image while a marker set, comprising a plurality of markers, and an object are in a first orientation relative to the camera. The capturing module may be further configured to capture a second image while the marker set and the object are in a second orientation, different than the first orientation, relative to the camera; wherein each of the first image and the second image comprises: a direct view of (i) the marker set, each of the markers having a fixed position relative to every other of the markers and (ii) the object; and a first reflection view of a first reflection of the markers and the object in a first mirror. The computer implementation system may include a determining module configured to determine, by a processor, a second indicator, of the second orientation, based on (i) the direct view of the marker set in the first image, (ii) the first reflection view of the marker set in the first image, (iii) a known distance between two of the markers, and (iv) a focal length of the camera. The capturing module may be further configured to determine, by a processor, a second indicator, of the second orientation, based on (i) the direct view of the marker set in the second image, (ii) the first reflection view of the marker set in the second image, (iii) the known distance between two of the markers, and (iv) the focal length of the camera. The computer implementation system may include a rendering module configured to render a three-dimensional model of the object, based on (i) the direct view of the object in the first image, (ii) the first reflection view of the object in the first image, (iii) the first indicator, (iv) the direct view of the object in the second image, (v) the first reflection view of the object in the second image, and (vi) the second indicator.

The computer implementation system may include a capturing module that, by a processor, captures an image containing a view of an object, a first reflection of the object in a first mirror, a second reflection of the object in a second mirror, and a third reflection, of the first reflection in the second mirror. The computer implementation system may further include a determining module that, by a processor and from the image, determines an indicator of a first distance, from the camera to a region on a surface of the object; determines an indicator of a second distance, from the camera to the region on the surface of the object as viewed in the image of the first reflection; determines an indicator of a third distance, from the camera to the region on the surface of the object as viewed in the image of the second reflection; and determines an indicator of a fourth distance, from the camera to the region on the surface of the object as viewed in the image of the third reflection. The computer implementation system may include a rendering module that, by a processor, renders a model of the object based on the image. The computer implementation system may include an output module that, by a processor, outputs the model to a display.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A method, comprising:

with a camera, capturing a first image while a marker set, comprising a plurality of markers, and an object are in a first orientation relative to the camera;

with the camera, capturing a plurality of reference images while the marker set and the object are in the first orientation, wherein each of the plurality of reference images is captured while a different one of the plurality of markers is activated;

with the camera, capturing a second image while the marker set and the object are in a second orientation, different than the first orientation, relative to the camera;

with the camera, capturing a plurality of additional reference images while the marker set and the object are in the second orientation, wherein each of the plurality of additional reference images is captured while a different one of the plurality of markers is activated;

wherein each of the first image and the second image comprises:
  a direct view of (i) the marker set, each of the markers having a fixed position relative to every other of the markers and (ii) the object;
  a first reflection view of first reflections of the markers and the object in a first mirror;
  a second reflection view of second reflections of the markers and the object in a second mirror; and
  a third reflection view of third reflections, of the first reflections in the second mirror;

identifying, for each one of the plurality of markers in a corresponding one of the reference images, a corresponding one of the first reflections, a corresponding one of the second reflections, and a corresponding one of the third reflections;

identifying, for each one of the plurality of markers in a corresponding one of the additional reference images, a corresponding one of the first reflections, a corresponding one of the second reflections, and a corresponding one of the third reflections;

based on (i) the direct view of the marker set in the first image, (ii) the first reflection view of the marker set in the first image, (iii) the second reflection view of the markers in the first image, (iv) the third reflection view of the markers in the first image, (v) a known distance between two of the markers, and (vi) a focal length of the camera, determining a first indicator, of the first orientation;

based on (i) the direct view of the marker set in the second image, (ii) the first reflection view of the marker set in the second image, (iii) the second reflection view of the markers in the second image, (iv) the third reflection view of the markers in the second image, (v) the known distance between two of the markers, and (vi) the focal length of the camera, determining a second indicator, of the second orientation;

based on (i) the direct view of the object in the first image, (ii) the first reflection view of the object in the first image, (iii) the first indicator, (iv) the direct view of the object in the second image, (v) the first reflection view of the object in the second image, and (vi) the second indicator, rendering a three-dimensional model of the object.

2. The method of claim 1, wherein determining the first indicator comprises determining distances from the camera to each of the markers.

3. The method of claim 2, wherein determining distances from the camera to each of the markers comprises:
determining each of the distances as a scale factor;
converting the scale factor to an absolute distance based on the known distance between at least two of the markers.

4. The method of claim 1, further comprising: outputting the model to a display.

5. The method of claim 1, further comprising:
capturing a plurality of additional images as the object is rotated relative to the camera; and
for each of the plurality of additional images, determining an orientation of the object relative to the camera.

6. The method of claim 1, wherein the first mirror and the second mirror are planar mirrors oriented relative to each other with an initially unknown angle.

7. The method of claim 1, wherein the first mirror and the second mirror are stationary.

8. The method of claim 1, further comprising determining an indicator of the focal length of the camera by the equation:

$$\begin{pmatrix} u_{m_2} - u_o \\ v_{m_2} - v_o \\ f \end{pmatrix} \cdot \begin{pmatrix} u_{e_2} - u_o \\ v_{e_2} - v_o \\ f \end{pmatrix} = 0,$$

where
$u_0$ and $v_0$ are coordinates, on the first image and the second image, of a principal point;
$u_{m2}$ and $v_{m2}$ are coordinates, on the first image and the second image, of a vanishing point of lines $i_{a12}\ i_{a2}$ and $i_{b12}\ i_{b2}$;
$u_{e2}$ and $v_{e2}$ are coordinates, on the first image and the second image, of a vanishing point of (i) a line between one of the markers and a second reflection of the one of the markers and (ii) a line between a first reflection of the one of the markers and a third reflection of the one of the markers; and
f is the focal length.

9. The method of claim 8, wherein the principal point is the center of the image.

10. A method, comprising:
with a camera, capturing a first image while a marker set, comprising a plurality of markers each having a fixed position relative to every other of the markers, and an object are in a first orientation relative to the camera;
with the camera, capturing a plurality of reference images while the marker set and the object are in the first orientation, wherein each of the plurality of reference images is captured while a different one of the plurality of markers is activated;
with the camera, capturing a second image while the marker set and the object are in a second orientation, different than the first orientation, relative to the camera;
with the camera, capturing a plurality of additional reference images while the marker set and the object are in the second orientation, wherein each of the plurality of additional reference images is captured while a different one of the plurality of markers is activated;
wherein each of the first image and the second image comprises:
a direct view of (i) the marker set and (ii) the object;
a first reflection view of first reflections of the marker set and the object in a first mirror;
a second reflection view of second reflections of the marker set and the object in a second mirror; and
a third reflection view of third reflections, of the first reflections in the second mirror;
identifying, for each one of the plurality of markers, a corresponding one of the first reflections in a corresponding one of the reference images, a corresponding one of the second reflections in a corresponding one of the reference images, and a corresponding one of the third reflections in a corresponding one of the reference images;
identifying, for each one of the plurality of markers, a corresponding one of the first reflections in a corresponding one of the additional reference images, a corresponding one of the second reflections in a corresponding one of the additional reference images, and a corresponding one of the third reflections in a corresponding one of the additional reference images;
based on (i) the direct view of the marker set in the first image, (ii) the first reflection view of the marker set in the first image, (iii) the second reflection view of the marker set in the first image, (iv) the third reflection view of the marker set in the first image, and (v) a known distance between two of the markers, determining a first indicator, of the first orientation;
based on (i) the direct view of the marker set in the second image, (ii) the first reflection view of the marker set in the second image, (iii) the second reflection view of the marker set in the second image, (iv) the third reflection view of the marker set in the second image, and (v) the known distance between two of the markers, determining a second indicator, of the second orientation;
based on (i) the direct view of the object in the first image, (ii) the first reflection view of the object in the first image, (iii) the first indicator, (iv) the direct view of the object in the second image, (v) the first reflection view of the object in the second image, and (vi) the second indicator, rendering a three-dimensional model of the object.

11. The method of claim 10, wherein determining the first indicator comprises determining distances from the camera to each of the markers.

12. The method of claim 11, wherein determining distances from the camera to each of the markers comprises:
determining each of the distances as a scale factor;
converting the scale factor to an absolute distance based on the known distance between at least two of the markers.

13. The method of claim 10, further comprising: outputting the model to a display.

14. The method of claim 10, further comprising:
capturing a plurality of additional images as the object is rotated relative to the camera; and
for each of the plurality of additional images, determining an orientation of the object relative to the camera.

15. A computer implementation system, comprising:
a capturing module configured to capture, from a camera and by a processor, a first image while a marker set, comprising a plurality of markers, and an object are in a first orientation relative to the camera;
wherein the capturing module is further configured to capture a second image while the marker set and the object are in a second orientation, different than the first orientation, relative to the camera;
wherein the capturing module is further configured to capture a plurality of reference images while the marker set and the object are in the first orientation, wherein each of the plurality of reference images is captured while a different one of the plurality of markers is activated;

wherein the capturing module is further configured to capture a plurality of additional reference images while the marker set and the object are in the second orientation, wherein each of the plurality of additional reference images is captured while a different one of the plurality of markers is activated;

wherein each of the first image and the second image comprises:
- a direct view of (i) the markers, each of the markers having a fixed position relative to every other of the markers and (ii) the object;
- a first reflection view of first reflections of the markers and the object in a first mirror;
- a second reflection view of a second reflection of the markers and the object in a second mirror; and
- a third reflection view of a third reflection, of the first reflection in the second mirror;

a determining module configured to determine, by a processor and for each one of the plurality of markers in a corresponding one of the reference images, a corresponding one of the first reflections, a corresponding one of the second reflections, and a corresponding one of the third reflections;

wherein the determining module is further configured to determine, by a processor and for each one of the plurality of markers in a corresponding one of the additional reference images, a corresponding one of the first reflections, a corresponding one of the second reflections, and a corresponding one of the third reflections;

wherein the determining module is further configured to determine, by a processor, a first indicator, of the first orientation, based on (i) the direct view of the markers in the first image, (ii) the first reflection view of the markers in the first image, (iii) the second reflection view of the markers in the first image, (iv) the third reflection view of the markers in the first image, (v) a determined distance between two of the markers, and (iv) a focal length of the camera;

wherein the determining module is further configured to determine, by a processor, a second indicator, of the second orientation, based on (i) the direct view of the markers in the second image, (ii) the first reflection view of the markers in the second image, (iii) the second reflection view of the markers in the second image, (iv) the third reflection view of the markers in the second image, (v) the determined distance between two of the markers, and (vi) the focal length of the camera;

a rendering module configured to render a three-dimensional model of the object, based on (i) the direct view of the object in the first image, (ii) the first reflection view of the object in the first image, (iii) the first indicator, (iv) the direct view of the object in the second image, (v) the first reflection view of the object in the second image, and (vi) the second indicator.

16. The method of claim 15, further comprising an outputting module configured to output the model to a display.

17. The computer implementation system of claim 15, wherein the determining module is further configured to determine an indicator of the focal length of the camera by the equation:

$$\begin{pmatrix} u_{m_2} - u_o \\ v_{m_2} - v_o \\ f \end{pmatrix} \cdot \begin{pmatrix} u_{e_2} - u_o \\ v_{e_2} - v_o \\ f \end{pmatrix} = 0,$$

where
- $u_0$ and $v_0$ are coordinates, on the first image and the second image, of a principal point;
- $u_{m2}$ and $v_{m2}$ are coordinates, on the first image and the second image, of a vanishing point of lines $i_{a12}$ $i_{a2}$ and $i_{b12}$ $i_{b2}$;
- $u_{e2}$ and $v_{e2}$ are coordinates, on the first image and the second image, of a vanishing point of (i) a line between one of the markers and a second reflection of the one of the markers and (ii) a line between a first reflection of the one of the markers and a third reflection of the one of the markers; and
- f is the focal length.

18. The computer implementation system of claim 15, wherein the principal point is the center of the image.

* * * * *